3,510,527
PREPARATION OF p-NITROPHENOLS
Thomas J. Prosser, Sherwood Park, Del., assignor to Hercules Incorporated, Wilmington, Del., a corporation of Delaware
No Drawing. Filed May 18, 1967, Ser. No. 639,283
Int. Cl. C07c 79/00
U.S. Cl. 260—622                                    7 Claims

ABSTRACT OF THE DISCLOSURE

The process involves nitrosation and nitration of phenol to produce p-nitrophenol as principal product. The reactions are carried out in an aqueous nitric acid medium under controlled conditions. The process also is applicable to ortho- and meta-cresols.

---

The commercial method for the preparation of p-nitrophenol involves the two steps of nitration of chlorobenzene followed by hydrolysis of the mononitrochlorobenzene. These two steps are carried out separately and independently. The large percentage of the ortho isomer produced and the lack of markets for this isomer make the cost of the para isomer high.

It is known that p-nitrophenol can also be made by direct nitration of phenol, but the ratio of para isomer to total mononitrophenol likewise is unfavorable and its separation is difficult. It has been observed that p-nitrophenol can be made by nitration of p-nitrosophenol, but the cost of separate production of p-nitrosophenol by known methods defeats the economics of this route.

In the nitrosation of phenol careful control in the temperature, ratio of phenol to nitrous acid, concentration of nitrous acid as indicated by pH, and rapid insolubilization of nitrosophenol by salting out have been stressed. The reactions to be avoided by careful control are oxidation of the phenol, diazooxide formation by reaction of p-nitrosophenol with nitrous acid, reaction of the product with oxides of nitrogen liberated from nitrous acid, and interaction of various products which form tars.

Although contrary to the teachings of the art for the production of p-nitrosophenol, it was conceived that, if p-nitrosophenol could be prepared under conditions that would effect rapid nitration of the p-nitrosophenol, p-nitrophenol could be prepared by nitrosating phenol under nitrating conditions. However, this concept presents many more problems since nitrosation gives tars at nitration temperature and nitration is impractically slow at the best nitrosation temperatures.

It is, therefore, an object of the present invention to modify the aforementioned concept and overcome the problems inherent in simultaneous nitrosation and nitration of phenol.

It is also an object of the present invention to nitrosate phenol in a nitric acid medium and to nitrate the resultant p-nitrosophenol to p-nitrophenol in the same nitric acid medium.

It is a further object to produce p-nitrophenol stepwise from phenol in a nitric acid medium via p-nitrosophenol without separating p-nitrosophenol.

It is a further object to produce p-nitrophenol stepwise from phenol via p-nitrosophenol in a salt-free nitric acid medium.

It is a still further object to produce p-nitrophenol stepwise from phenol via-p-nitrosophenol using oxides of nitrogen in nitric acid solution as the nitrosating-nitrating reagent.

It is also an object to react phenol with nitrous acid in a nitric acid solution and to react the intermediate p-nitrosophenol with the nitric acid in the same solution with recovery of the oxides of nitrogen set free in the nitration step.

It is a further object to recover the oxides of nitrogen and nitric acid mother liquor for recycle to the nitrosation step of the process.

It is also a further object to react phenol with nitrous acid in a nitric acid medium with the production of a slurry of p-nitrosophenol in one step and to react the p-nitrosophenol with the nitric acid in the slurry to produce a p-nitrophenol slurry from which p-nitrophenol low in ortho isomer content is recovered and the mother liquor nitric acid and oxides of nitrogen are recovered for reuse.

These objects are accomplished by bringing together continuously and simultaneously in an aqueous nitric acid medium of nitric acid of concentration in the range of 5 to 30% by weight, phenol and nitrous acid in a molecular ratio in the range of 1:1 to 1:1.5 at a temperature in the range of 0–10° C. until the phenol is substantially completely reacted and a slurry of p-nitrosophenol in 10 to 100 times its weight of said nitric acid medium is produced, decomposing to nitric oxide the nitrous acid remaining in and subsequently formed in the nitric acid, separating said nitric oxide while gradually raising the temperature to the range of 15–30° C., and continuing the decomposition of said nitrous acid to nitric oxide and separation of nitric oxide while heating at this temperature until nitric oxide formation has substantially ceased and the p-nitrosophenol slurry has been converted to a p-nitrophenol slurry, and separating the p-nitrophenol therefrom.

The process is represented stepwise by the following reactions:

(1) Phenol+HNO$_2$→p-nitrosophenol+H$_2$O (2) p-Nitrosophenol+HNO$_3$→p-nitrophenol+HNO$_2$ The overall reaction is:

Phenol+HNO$_3$→p-nitrophenol+H$_2$O

The nitrous acid used in Step 1 is reproduced in Step 2 and is recovered for recycle by decomposing to oxides of nitrogen and reforming as nitrous acid in nitric acid.

The reaction medium is nitric acid of concentration in the range of 5–30%. The concentration is preferably 12–18% and is conveniently intermediate between 12% and 18%, i.e., about 15%. This preferred range makes it more convenient for recycle of the nitric acid for reuse.

The amount of aqueous nitric acid solution is 10 to 100 times the weight of the phenol. This provides an intermediate p-nitrosophenol slurry of concentration in the range of 1 to 10%. A slurry of p-nitrosophenol of 10% concentration requires special equipment for cooling since it is thick. It is easier to handle a slurry of less than 7% concentration than one of 10% concentration. For large scale production, a slurry of 2–5% is most easily handled. The preferred amount of aqueous nitric acid is thus 20–50 times the weight of p-nitrosophenol.

The amount of nitrous acid to be introduced along with phenol into the reaction mixture of nitric acid is that requisite for nitrosating all of the phenol to p-nitrosophenol. A molecular excess is preferred in order that all of the phenol may be nitrosated. Part of the excess unavoidably reacts with p-nitrosophenol forming diazo oxide. Since the unreacted nitrous acid is recovered from the system for reuse, the excess based on economics is preferably from 0.1 to about 0.25 excess, and it may extend to 0.5 excess. Thus, the nitrous acid is preferably 1.2 to 1.4 times the molecular amount of phenol, but it may extend to 1.5 times.

The nitrous acid is produced in the aqueous nitric acid used as the reaction medium by addition of oxides of nitrogen which react therewith to form nitrous acid. The oxides of nitrogen which may be so used are nitric oxide, NO, nitrogen tetroxide, $N_2O_4$, or nitrogen trioxide, $N_2O_3$. The nitric oxide reacts with the aqueous nitric acid according to the equation:

$$2NO + HNO_3 + H_2O \rightarrow 3HNO_2$$

The nitrogen tetroxide reacts with the water of the aqueous acid according to the equation:

$$N_2O_4 + H_2O \rightarrow HNO_2 + HNO_3$$

The nitrogen trioxide reacts with water of the aqueous acid according to the equation:

$$N_2O_3 + H_2O \rightarrow 2HNO_2$$

The nitric oxide reaction with nitric acid is reversible, and the reverse reaction is generally used for recovery of nitric oxide from the nitrous acid remaining at the end of the nitrosation and that produced in the subsequent nitration step. The nitrogen trioxide is readily produced by mixing $N_2O_4$ with nitric oxide.

The oxide of nitrogen is introduced to the aqueous nitric acid as a gas at atmospheric or higher pressure. Nitrogen trioxide also may be introduced as a liquid. A nitrogen atmosphere may be included to maintain a closed system at atmospheric or higher pressure. A nitrogen atmosphere is optional when the oxide of nitrogen is being added. The oxide of nitrogen is added in such a manner that it is quickly mixed with the nitric acid solution in a mixing chamber or in the reaction vessel to be used. This addition of the oxide of nitrogen to the nitric acid may be carried out before adding the acid to the reaction vessel or while simultaneously adding the phenol. Alternatively, the oxide of nitrogen may be added to part of the nitric acid while gradually adding the resulting mixture of nitrous acid and nitric acid to the reaction mixture simultaneously with the phenol. The oxide of nitrogen, in another alternative way, may be mixed with the nitric acid as it is being added to the system, and the phenol may be added simultaneously while introducing the aqueous mixed nitrous-nitric acid composition.

The temperature of the reaction is maintained in the range of 0–10° C. during the nitrosation. The reagents are preferably brought together cold. Since heat is evolved, cooling of the reaction mixture is necessary to avoid a premature rise in temperature. In one procedure, the reagents are cooled before mixing the phenol with the nitrous acid-nitric acid mixture. In another procedure, the aqueous acid mixture is cooled while the phenol and oxide of nitrogen for the production of nitrous acid in the aqueous nitric acid solution are being introduced to the reaction vessel. The present invention is not limited by the manner in which the temperature is controlled.

In the nitrosation step, the p-nitrosophenol which is formed crystallizes out of the reaction mixture substantially as fast as it is formed. Nevertheless, during the nitrosation, some of the initially formed p-nitrosophenol reacts with the nitric acid and is converted into p-nitrophenol. This is not objectionable in this process as it would be if the end product were to be p-nitrosophenol. However, the p-nitrophenol which is formed has an effect on the crystal form of p-nitrosophenol so that a thick slurry forms by the time that the nitrosation is complete, and it is the thickening of the slurry at this stage that determines the amount of aqueous nitric to be used for a given amount of phenol as set forth above. When the nitrosation step is complete, this stage may be detected by a decrease in heat evolution and an increase in nitrous acid content of the reaction mixture. At this stage the removal of the excess oxides of nitrogen is begun.

The oxides are best removed by pumping the gas under reduced pressure, and a nitrogen sparge may also be used to facilitate their removal. Other inert gases may be used for sparging.

After the removal of the oxides of nitrogen from the slurry has been started, the temperature is allowed to rise gradually to the range of 15–30° C., in which temperature range the conversion of the p-nitrosophenol to p-nitrophenol takes place. The nitrous acid left over from the nitrosation, as well as the nitrous acid produced in the conversion of the p-nitrosophenol to p-nitrophenol, is converted to nitric oxide, nitric acid and water in accordance with the equation:

$$3HNO_2 \rightarrow 2NO + HNO_3 + H_2O$$

and this reaction is carried to completion by continual removal of the nitric oxide as it is produced from the nitrous acid being formed in this second step of the process.

As the second step progresses, the thick slurry gradually changes to a thin, readily stirrable slurry, and completion of the reaction is readily determined by a decrease in the formation of nitrous acid and liberation of nitric oxide.

When the second step is complete, the p-nitrophenol is separated from the slurry in any well-known manner as by filtering or centrifuging. The p-nitrophenol is washed with water and dried. The wash water containing nitric acid is, when desired, used as make-up water for nitric acid used in the process, and the nitric acid of 5–30% concentration is recovered as mother liquor of the slurry to be used for recycle to the nitrosation step.

The recycle acid is substantially free of organic material, but it may be purified in whole or part by heating to decompose any residual organic material it may contain. The decomposition gases of oxides of nitrogen are recovered from oxides of carbon so produced. In practice a partial purge of the recycle acid is adequate, and the purified purged acid is then recycled.

In the process of this invention, the nitrosation step and the nitration step, while treated as separate steps, are not necessarily kept from overlapping. Since p-nitrophenol, which is formed fairly rapidly, is slowly nitrated to p-nitrophenol even under nitrosation conditions of this invention with dilute nitric acid, the nitration reaction begins to take place as soon as p-nitrosophenol is formed and it is suppressed by insolubilization of the p-nitrosophenol and by keeping the temperature low in the nitrosation range.

It is not objectionable that nitration of the nitrosophenol take place during the nitrosation reaction, but what is objectionable is the side reactions between phenol, nitrosophenol and nitrous acid which take place under the same conditions, leading to the formation of tars and diazo oxide. To avoid these reactions the phenol and the nitrous acid are brought together gradually and simultaneously in the nitric acid solution and the nitrous acid is maintained in low concentrations in the solution either by introducing a nitrous acid-nitric acid solution while adding the phenol or by introducing oxides of nitrogen simultaneously with the phenol so that the phenol and nitrous acid are brought into contact in substantially a 1:1 to 1:1.5 ratio. It is preferable to reduce the introduction of oxides of nitrogen toward the end of the nitrosation because of the nitrous acid being evolved as nitration slowly takes place.

If the phenol which is introduced into the reaction vessel has not completely reacted with the nitrous acid when the temperature is increased from the 0–10° C. range, the reaction will complete itself during the subsequent nitration step since both phenol and nitrous acid will be present until the conversion of all of the phenol takes place.

During the nitration step the removal of oxides of nitrogen keeps the nitrous acid in the mixture sufficiently low that the formation of diazo oxide from the p-nitrosophenol is kept at a minimum.

The process of this invention is highly economical and practical when integrated as described in the following suitable procedure.

The nitric acid of 5–30% concentration by weight is added in part to a cooled reaction vessel and phenol is added gradually while nitric oxide is gradually added to the nitric acid. The remaining nitric acid is also added gradually, and the nitric oxide is added to the incoming nitric acid as desired. These additions are such that the ratio of nitrous acid to phenol is maintained in the molecular range of 1:1 to 1:1.5 and the nitric acid in the vessel is 10 to 100 times the weight of p-nitrosophenol expected at any given time. The temperature is maintained at 0–10° C., and a nitrogen atmosphere is placed in the vessel. When the phenol has all been added, the excess nitrous acid is decomposed by putting a vacuum on the vessel and the nitric oxide is pumped off and transferred to nitric acid for later use or is transferred to a second nitrosation process.

As the nitric oxide evolution slows down, the temperature is allowed to rise to the 15–30° C. range to effect more rapid nitration and the nitric oxide removal is continued. As the nitration step takes place, the p-nitrosophenol slurry gradually becomes less thick and more easily stirred. When nitric oxide evolution ceases, the reaction is complete. The slurry of crystalline p-nitrophenol in dilute nitric acid is centrifuged and the p-nitrophenol is washed with water. The nitric acid mother liquor is transferred to a second nitrosation process or to storage. The depletion of the nitric acid in the recovered nitric acid is corrected by adding nitrogen dioxide or nitrogen trioxide, and the nitric acid is reused in another nitrosation. A portion of the nitric acid is taken for purification as a purge by oxidizing away the organic matter dissolved therein.

The p-nitrophenol produced in this process was 81–88% of the total mononitrophenols produced, and the overall yield was much greater based on phenol used than it would be by the usual method of preparing p-nitrosophenol in the absence of nitric acid and subsequently subjecting it to a nitric acid nitration. Pure p-nitrophenol is readily prepared from the crude mixture of this invention by well-known commercial methods of purification. Comparable results are obtained in the process of this invention using o-cresol and m-cresol in place of phenol.

It is to be understood that the term "nitration" as hereinbefore utilized to describe the process of conversion of p-nitrosophenol to p-nitrophenol is not to be construed as limiting as to the mechanism of the reaction involved. It is immaterial whether the process is one of oxidation of a nitroso group to a nitro group or a replacement of a nitroso group by a nitro group.

The process of this invention is illustrated by the following examples carried out in batch without recycle to show the effects of variables within the scope of the invention.

EXAMPLE 1

The reactor consisted of a 1-liter, 3-necked flask fitted with three dropping funnels (one jacketed and cooled to ca. −15° C. for addition of $N_2O_3$), a mechanical stirrer, a thermometer, a sparge tube and an air condenser. A portion (150 ml.) of a dilute $HNO_3$ solution prepared from 427 ml. of $H_2O$ and 135 g. of 70% $HNO_3$ (94.5 g., 1.50 moles $HNO_3$) was charged initially to the reactor and cooled to ca. 0° C. Simultaneous addition of 47.0 g. (0.50 mole) of phenol, 25.7 g. (0.34 mole) of $N_2O_3$ and the remaining dilute $HNO_3$ was then effected over a 1.0 hr. period at 1–4° C. Solids formed during the addition period leading eventually to a thick, nearly unstirrable tan slurry consisting mainly of p-nitrosophenol.

Following addition, the slurry was held at 2° C. for 1.0 hr. A $N_2$ sparge was initiated after the first half hour of the hold period and maintained for the remainder of the run. Following the hold period, the temperature was allowed to rise spontaneously to 15° C. to effect oxidation of p-nitrosophenol to p-nitrophenol. As the oxidation proceeded the thick slurry was converted to a mobile, crystalline brown mixture. Oxidation was carried out for 3.0 hrs. following the hold period.

At the end of the oxidation period, the reaction mixture was chilled to ca. 0° C. and filtered. The crystalline brown solids were washed with two 50-ml. portions of cold water and then dried in vacuum. The dried solids weighed 50.2 g. and had the following compositions: o-$NO_2$ 12.9%, p-$NO_2$ 84.8%, 2,4-di$NO_2$ 1.0%, p-diazo-oxide—trace. The combined filtrate and was weighed 618.3 g. and contained 0.21% o-$NO_2$, 1.37% p-$NO_2$, 0.05% 2,4-di$NO_2$ and 0.08% p-diazo-oxide (p-benzene-diazonium oxide). The total product conversions were as follows: o-$NO_2$ 11.5%, p-$NO_2$ 73.4%, 2,4-di$NO_2$ 0.9%, p-diazo-oxide 0.8%, total 86.6%. (o-$NO_2$=o-nitrophenol; 2,4-di$NO_2$=2,4-dinitrophenol; p-$NO_2$=p-nitrophenol).

EXAMPLE 2

The reaction described in Example 1 was repeated except that the initial charge to the reactor consisted of 140 ml. of pure water. The remaining 278 ml. of water and the 135 g. of 70% $HNO_3$ were mixed and added simultaneously with the other reagents. A sample of the total reaction mixture at the end of the run indicated the following reaction conversions: o-$NO_2$ 13.2%, p-$NO_2$ 83.9%, 2,4-di$NO_2$ nil, p-diazo-oxide 1.4%, total 98.5%.

EXAMPLE 3

Example 1 was repeated except that 10% of the total $N_2O_3$ charge was added prior to the main addition period in order to preform some $HNO_2$. The recovered solids weighed 51.5 g. and contained 14.8% o-$NO_2$, 87.5% p-$NO_2$, 0.5% 2,4-di$NO_2$ and 0.5% p-diazo-oxide. The mother liquor plus wash weighed 625.4 g. and contained 0.22% o-$NO_3$, 1.40% p-$NO_2$, 0.05% 2,4-di$NO_2$ and 0.12% p-diazo-oxide. The overall product conversions were: o-$NO_2$ 13.7%, p-$NO_2$ 77.5%, 2,4-di$NO_2$ 0.6%, p-diazo-oxide 1.6%, total 92.9%.

EXAMPLE 4

Example 1 was repeated except that 29% of the total $N_2O_3$ was added prior to the main addition period. The isolated solid product weighed 52.6 g. and contained 14.3% o-$NO_2$, 83.9% p-$NO_2$, and 0.2% p-diazo-oxide. The mother liquor plus wash weighed 614.3 g. and contained 0.20% o-$NO_2$, 1.19% p-$NO_2$, 0.04% 2,4-di$NO_2$ and 0.11% p-diazo-oxide. The total product conversions were: o-$NO_2$ 13.4%, p-$NO_2$ 73.5%, 2,4-di$NO_2$ 0.27%, p-diazo-oxide 1.4%, total 88.5%.

EXAMPLE 5

Example 1 was repeated except that 15% of the combined water and 70% $HNO_3$ constituted the initial reactor charge and 15% of the total $N_2O_3$ was added prior to the main addition period. The recovered solids weighed 52.0 g. and contained 12.5% o-$NO_2$, 85.4% p-$NO_2$, and 0.5% p-diazo-oxide. The mother liquor plus wash amounted to 614.7 g. and contained 0.21% o-$NO_2$, 1.41% p-$NO_2$, 0.04% 2,4-diNO and 0.13% p-diazo-oxide. The overall product conversions were: o-$NO_2$ 12.1%, p-$NO_2$ 76.6%, 2,4-di$NO_2$ 0.2%, p-diazo-oxide 1.7%, total 90.6%.

EXAMPLE 6

Example 5 was repeated but with the addition period extended to 1.5 hrs. The solid product weighed 51.1 g. and contained 10.3% o-$NO_2$, 86.3% p-$NO_2$, and 0.5% 2,4-di$NO_2$. The mother liquor plus wash weighed 624.9 g. and contained 0.22% o-$NO_2$, 1.41% p-$NO_2$, 0.05% 2,4-di$NO_2$ and 0.20% p-diazo-oxide. The total product conversions were: o-$NO_2$ 10.3%, p-$NO_2$ 76.1%, 2,4-di$NO_2$ 0.6%, p-diazo-oxide 2.2%, total 89.2%.

EXAMPLE 7

The reactor was similar to that described in Example 1 but contained a bottom drain cock. The initial reactor charge consisted of 82 ml. of $H_2O$. The remaining water (300 ml.) and 180 g. of 70% $HNO_3$ (126 g., 210 moles) were mixed and added to the reactor along with 47.0 g.

(0.50 mole) of phenol and 25.7 g. (0.34 mole) of $N_2O_3$ over a 1.5 hr. period at 1–3° C. A thick tan p-nitrosophenol slurry resulted at the end of the addition period. The mixture was held for 1.0 hr. at 2° C. and then allowed to warm to ca. 15° C. and held for 3.0 hrs. to effect oxidation. $N_2$ sparging was employed from the midpoint of the 1.0 hr. hold to the end of the run. The final product was a crystalline brown slurry.

The total crude reaction mixture was extracted by adding portions of $CH_2Cl_2$, agitating the mixture, allowing the phases to separate and draining off the lower $CH_2Cl_2$ phase. A total of 900 ml. of $CH_2Cl_2$ was employed in the extraction process. The combined extracts were stripped to dryness giving 62.0 g. of a dark brown solid material. The extracted mother liquor weighed 550.5 g. and contained 0.81% p-$NO_2$ and 0.05% p-diazo-oxide (no o-$NO_2$ detected). The solid product was steam distilled with a total distillate volume of 280 ml. taken off. The distillate contained 7.8 g. of o-nitrophenol. The dried distillation residue weighed 50.4 g. This was vacuum distilled (B.P.~128°/0.5–0.8 mm.) giving 46.2 g. of ca. 97% p-nitrophenol containing 2,4 - dinitrophenol as the only major impurity. The distilled product represented a 64.5% process conversion of p-nitrophenol. Total product conversions were: o-$NO_2$ 11.2%, p-$NO_2$ 70.9%, 2,4-di$NO_2$ 1.8%, p-diazo-oxide 0.5%, total 84.4%.

EXAMPLE 8

The reactor consisted of a 3-liter, 3-necked flask fitted as in Example 1. The initial charge consisted of 200 ml. of a solution prepared from 1,158 ml. of water and 336 g. of 70% $HNO_3$ (235 g., 3.72 mole). The reactor was cooled to ice bath temperature and 15% of the total $N_2O_3$ requirement (total $N_2O_3$=25.7 g., 0.34 mole) was added prior to the main addition period. Phenol (47.0 g., 0.50 mole) and the remainder of the $N_2O_3$ and dilute $HNO_3$ were then added over a 1.5 hr. period. A p-nitrosophenol slurry was formed but thinner and more mobile than observed in the higher concentration reaction (preceding examples). Following addition the mixture was held at 2–4° C. for 1.0 hr. and then warmed to 15° C. and held for an additional 3.0 hrs. $N_2$ sparging was initiated midway through the 1.0 hr. hold period and maintained for the remainder of the run. The final product was a mobile, crystalline mixture.

At the end of the reaction the crude product was cooled to 4° C., filtered and the filter cake washed with 2-75 ml. portions of cold water. The dried solid product weighed 38.3 g. and contained 15.9% o-$NO_2$ and 83.1% p-$NO_2$. The combined filtrate and wash contained 0.20% o-$NO_2$, 0.03% 2,4-di$NO_2$, 1.34% p-$NO_2$ and 0.04% p-diazo-oxide. Total product conversions were as follows: o-$NO_2$ 13.4%, p-$NO_2$ 76.7%, 2,4-di-$NO_2$ 0.5%, p-diazo-oxide 1.0%, total 91.6%.

EXAMPLE 9

Example 8 was repeated but with the 70% $HNO_3$ charge increased to 448 g. (314 g., 4.98 moles $HNO_3$) and the water requirement reduced to 1,046 g. A sample of the total crude reaction mixture at the end of the run gave the following product conversions: o-$NO_2$ 18.8%, p-$NO_2$ 77.4%, 2,4-di$NO_2$ 0.6%, p-diazo-oxide 0.9%, total 97.7%.

EXAMPLE 10

Example 8 was repeated but with the 70% $HNO_3$ charge decreased to 270 g. (189 g., 3.0 moles) and the water requirement increased to 1,224 ml. A sample of the total reaction mixture at the end of the process gave the following product conversions: o-$NO_2$ 13.1%, p-$NO_2$ 68.2%, p-NO 5.3%, p-diazo-oxide, 2.7%, total 89.3%.

EXAMPLE 11

Example 8 was repeated except that aspirator vacuum was applied at the point where nitrogen sparging was initiated. Evacuation was used as an alternate method of removing NO from the system. Vacuum was applied gradually because of the tendency of the reaction mass to froth and expand. Eventually full aspirator vacuum (ca. 30 in. Hg) was applied. The final crude product mixture was cooled to 4° C., filtered and the solids washed with 2–50 ml. portions of water. The dried solids weighed 39.4 g. and contained 10.5% o-$NO_2$, 88.9% p-$NO_2$, and 0.5% p-diazo-oxide. The combined filtrate and wash weighed 1563.2 g. and contained 0.23% o-$NO_2$, 1.41% p-$NO_2$, 0.02% 2,4-di$NO_2$ and 0.02% p-diazo-oxide. The total product conversions were: o-$NO_2$ 11.0%, p-$NO_2$ 82.0%, 2,4-di$NO_2$ 0.3%, p-diazo-oxide 0.8%, total 94.1%.

EXAMPLE 12

The reactor consisted of a 3-liter, 3-necked flask fitted with a stirrer, 2-dropping funnels, a thermometer, a gas inlet tube and an air condenser. The initial reactor charge consisted of 200 ml. of a solution prepared from 380 g. of 70% $HNO_3$ (266 g., 4.23 moles $HNO_3$) and 1,140 ml. of water. This was equilibrated under 1 atm. of NO pressure at ice bath temperature for 0.5 hr. Following equilibration 47.0 g. (0.50 mole) of phenol and the remainder of the dilute $HNO_3$ were added simultaneously to the reactor at 2–3° C. over a 1.5 hr. period. Gaseous NO was added continuously to the system to maintain the desired 1 atm. pressure. The usual mobile tan p-nitrosophenol slurry formed during the addition period.

Following addition the reactor was held for 1.0 hr. at ice bath temperature and then warmed to 15° C. and held for an additional 3.0 hrs. to effect oxidation. $N_2$ sparging was initiated at the midpoint of the hold period and maintained for the remainder of the run. The final product consisted of a light brown crystalline mixture which was chilled to 3° C., filtered and the solids washed with 2–100 ml. portions of cold water. After vacuum drying the solids weighed 39.1 g. and contained 14.2% o-$NO_2$ and 87.7% p-$NO_2$. The combined filtrate and wash liquor weighed 1580.9 g. and contained 0.22% o-$NO_2$, 0.02%, 2,4-di$NO_2$, 1.33% p-$NO_2$ and 0.06% p-diazo-oxide. The total product conversions were: o-$NO_2$ 13.0%, p-$NO_2$ 79.6%, 2,4-di$NO_2$ 0.3%, p-diazo-oxide 1.7%, total 94.6%.

EXAMPLE 13

The reactor was essentially that described in Example 12. The system was sparged with NO gas and 200 ml. of a solution prepared from 351 g. of 70% $HNO_3$ (246 g., 3.90 moles $HNO_3$) and 1,159 ml. of water was added. The initial charge was equilibrated for 0.5 hr. at ice bath temperatures under 1 atm. NO pressure and then 47.0 g. (0.50 mole) of phenol and the remainder of the dilute-$HNO_3$ were added over a 1.5 hr. period. The pressure of NO in the reactor was maintained at 1 atm. at all times. A mobile, tan p-nitrosophenol slurry formed during the addition period. Following addition the mixture was held for 0.5 hr. at 3° C. Vacuum was then applied, gradually at first, and the mixture held for an additional 0.5 hr. at 3° C. The temperature was then increased to 15° C. and the reaction continued for a further 3.0 hrs. Full vacuum of ca. 29 in. Hg was eventually applied during the oxidation period. The final red-tan crystalline mixture was chilled to 4° C., filtered and the solids washed with 2–50 ml. portions of cold water. The vacuum dried solids weighed 39.4 g. and contained 9.0% o-$NO_2$, 89.4% p-$NO_2$ and 0.5% p-diazo-oxide. The filtrate and first wash combined weighed 1497.8 g. and contained 0.24% o-$NO_2$, 1.47% p-$NO_2$, 0.02% 2,4-di$NO_2$, 0.06% p-diazo-oxide and 14.2% $HNO_3$. The second wash collected separately weighed 56.1 g. and contained 0.12% o-$NO_2$, 0.94% p-$NO_2$, 0.01% 2,4-di$NO_2$ and 0.01% p-diazo-oxide. Total product conversions were: o-$NO_2$ 10.4%, p-$NO_2$ 83.1%, 2,4-di$NO_2$ 0.3%, p-diazo-oxide 1.7%, total 95.5%.

EXAMPLE 14

Example 13 was repeated but the aqueous $HNO_3$ was provided by 57.4 g. of fresh 70% $HNO_3$ (40.2 g., 0.64 mole $HNO_3$) and 1,453 g. of the filtrate from Example 13 (containing 206 g., 3.28 moles $HNO_3$). The recovered dried solids weighed 62.0 g. and contained 9.8% o-$NO_2$, 90.8% p-$NO_2$ and 0.5% p-diazo-oxide. This corresponds to o- and p-nitrophenol conversions of 8.7 and 81.0%, respectively. The filtrate weighed 1462.4 g. and contained 0.17% o-$NO_2$, 1.38% p-$NO_2$, 0.08% 2,4-di$NO_2$ and 0.09% p-diazo-oxide. The wash liquor weighed 62.5 g. and contained 0.15% o-$NO_2$, 1.19% p-$NO_2$, 0.01% 2,4-di$NO_2$ and 0.04% p-diazo-oxide. Total product conversions (corrected for organics added with the recycle liquor) were: o-$NO_2$ 7.3%, p-$NO_2$ 80.4%, 2,4-di$NO_2$ 0.9%, p-diazo-oxide 1.2%, total 89.8%.

A 50.0 g. portion of the solid product was subjected to steam distillation giving as residue 44.3 g. of crude dark brown p-nitrophenol containing 0.3% o-$NO_2$ and 0.3% 2,4-di$NO_2$ as the detected impurities. Pure o-nitrophenol (5.0 g.) was recovered from the aqueous distillate. A 40.0 g. portion of the residue was vacuum distilled through a 10″ Vigreux column to effect final purification. Distillation data appear below:

| Fraction | Boiling point | | Wt. (g.) | Composition (percent) | | |
|---|---|---|---|---|---|---|
| | Temp. (° C.) | Press. (mn.) | | o-$NO_2$ | 2,4-di$NO_2$ | p-$NO_2$ |
| 1 | 127–132 | 0.7–0.8 | 2.38 | n.d. | 0.44 | Main component. |
| 2 | 132–138 | 0.7–1.1 | 19.16 | n.d. | 0.32 | Do. |
| 3 | 132–137 | 0.7–1.2 | 15.20 | n.d. | 0.06 | Do. |
| Residue* | | | 2.64 | n.d. | n.d. | n.d. |

*Residue composed mainly of carbonaceous material.
n.d.—None detected.
NOTE.—Fractions 1, 2 and 3 taken as essentially pure p-nitrophenol represent a 72.5% process conversion for the overall process.

EXAMPLE 15

The procedure of Example 1 was applied to m-cresol. The amount of m-cresol used was 54.0 g. (0.50 mole). The overall conversion to 3-methyl-4-nitrophenol was 80.0%.

What I claim and desire to protect by Letters Patent is:

1. The process which comprises continuously and simultaneously bringing together a phenol, selected from the group consisting of phenol, o-cresol and m-cresol, and nitrous acid in an aqueous nitric acid medium of concentration in the range of 5 to 30% by weight, the molecular ratio of said phenol to nitrous acid being in the range of 1:1 to 1:1.5, at a temperature in the range of 0 to 10° C. until said phenol is substantialy completely reacted and a slurry of the corresponding p-nitrosophenol in 10 to 100 times its weight of said nitric acid medium is produced, decomposing to nitric oxide the nitrous acid remaining in and subsequently formed in the nitric acid by applying a vacuum, separating said nitric oxide while gradually raising the temperature to the range of 15 to 30° C., and continuing the decomposition of said nitrous acid to nitric oxide and separation of nitric oxide while heating at this temperature until nitric oxide formation has substantially ceased and the slurry of said p-nitrosophenol has been converted to a slurry of the corresponding p-nitrophenol, and separating said p-nitrophenol therefrom.

2. The process of claim 1 in which the phenol is phenol.

3. The process of claim 1 in which the phenol is o-cresol.

4. The process of claim 1 in which the phenol is m-cresol.

5. The process of claim 1 in which the concentration of nitric acid is 12–18% and the amount of aqueous nitric acid is 20–50 times the weight of the p-nitrosophenol to be produced.

6. The process of claim 1 in which the nitrous acid is produced in situ by adding an oxide of nitrogen of the group consisting of nitric oxide, nitrogen tetroxide and nitrogen trioxide to the nitric acid medium simultaneously with the phenol so as to effect the maintenance of a phenol to nitrous acid ratio in the range of 1:1 to 1:1.5 during the addition.

7. The process of claim 3 in which the nitric oxide separated from the reaction mixture after the nitrosation step and the nitric oxide separated from the p-nitrophenol slurry are recycled to the nitrosation step of the process.

References Cited

UNITED STATES PATENTS 3,221,062  11/1965  Wright _____ 260—622

OTHER REFERENCES

Bunton et al.: J. Chem. Soc. (1950), part III, pp. 2629–2644.

Veibel: Ber. (1930), vol. 63, pp. 1577–82.

Bunton et al.: J. Chem. Soc. (1950), pp. 2646–2656.

BERNARD HELFIN, Primary Examiner

W. B. LONE, Assistant Examiner